US009342606B2

(12) United States Patent
Baldwin et al.

(10) Patent No.: US 9,342,606 B2
(45) Date of Patent: May 17, 2016

(54) INTELLIGENT SOFTWARE INSTALLATION

(71) Applicant: International Business Machines Corporation, Armonk, NY (US)

(72) Inventors: Timothy J. Baldwin, Southampton (GB); Jason C. Edmeades, Chandlers Ford (GB); Peter J. Johnson, Chandlers Ford (GB); David Locke, Chandlers Ford (GB); Fenglian Xu, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/711,096

(22) Filed: Dec. 11, 2012

(65) Prior Publication Data

US 2014/0164386 A1  Jun. 12, 2014

(51) Int. Cl.
*G06F 17/30* (2006.01)
*G06F 9/445* (2006.01)

(52) U.S. Cl.
CPC ............ *G06F 17/30867* (2013.01); *G06F 8/61* (2013.01); *G06F 17/30699* (2013.01)

(58) Field of Classification Search
CPC .................... G06F 17/30707; G06F 17/30595; G06F 17/3061
USPC .......................................................... 707/740
See application file for complete search history.

(56) References Cited

U.S. PATENT DOCUMENTS

| 7,805,722 | B2 | 9/2010 | Mori et al. |
| 8,185,891 | B2 | 5/2012 | DeHaan |
| 8,239,855 | B2 | 8/2012 | Wetherell et al. |
| 8,468,164 | B1 * | 6/2013 | Paleja ............... G06F 17/30867 707/767 |
| 2006/0048059 | A1 * | 3/2006 | Etkin ................ G06F 17/30699 715/745 |
| 2010/0268661 | A1 * | 10/2010 | Levy et al. ..................... 705/347 |
| 2012/0072283 | A1 * | 3/2012 | DeVore ............. G06Q 30/0251 705/14.49 |
| 2012/0110463 | A1 * | 5/2012 | Brolley ............. G06Q 30/0282 715/738 |
| 2012/0131564 | A1 | 5/2012 | Das |
| 2012/0143694 | A1 * | 6/2012 | Zargahi ............. G06Q 30/0603 705/14.66 |
| 2013/0007009 | A1 * | 1/2013 | Caldwell et al. .............. 707/748 |
| 2013/0085886 | A1 * | 4/2013 | Satish ..................... G06Q 30/02 705/26.7 |
| 2013/0232256 | A1 * | 9/2013 | Lee ......................... H04L 43/04 709/224 |
| 2013/0326499 | A1 * | 12/2013 | Mowatt ..................... G06F 8/60 717/177 |

FOREIGN PATENT DOCUMENTS

CN          102073485 A      5/2011

OTHER PUBLICATIONS

Almeza, "Unattended Installation Software for Windows" Copyright 2012 [online], [retrieved on Apr. 9, 2012]. Retrieved from the Internet <URL: http://www.almeza.com/>.
FAI-Project.org, "FAI—Fully Automatic Installation" [online], [retrieved on Apr. 9, 2012]. Retrieved from the Internet <URL: http://fai-project.org/>.

(Continued)

*Primary Examiner* — Hosain Alam
*Assistant Examiner* — Robert F May
(74) *Attorney, Agent, or Firm* — Alexa L. Ashworth; Jason H. Sosa

(57) ABSTRACT

A computer system determines a category of users to which a user of a computer belongs. The computer system determines a relationship between the category of users and at least one program available for installation from the computer system. Based on the determined relationship, the computer system determines that at least one feature of the at least one program are of potential interest to the user of the computer. The computer system notifies the user of the at least one feature of the at least one program of potential interest.

6 Claims, 4 Drawing Sheets

(56) References Cited

OTHER PUBLICATIONS

Installbuilders, "Smart Install Maker—Custom setup files made easy" Copyright 2004-2012 [online], [retrieved on Apr. 9, 2012]. Retrieved from the Internet <URL: http://www.sminstall.com/>.

Ubuntu Geek, "Zero Install Injector—Install software easily and without root privileges" Copyright 2005-2012 [online], [retrieved on Apr. 9, 2012]. Retrieved from the Internet <URL: http://www.ubuntugeek.com/zero-install-injector-install-software-easily-and-without-root-privileges.html>.

* cited by examiner

INTELLIGENT SOFTWARE INSTALLATION

FIELD OF THE INVENTION

The present invention relates generally to the field of software installation, and more particularly, to determining features and programs to be installed for a particular user.

BACKGROUND OF THE INVENTION

Generally, when a user of a computer wants to install a program, the user manually seeks out relevant installation files, typically online or through removable storage media such as a CD-ROM, and executes the files. Alternatively, a program may actively offer software, and the relevant installation files, directly to a user. For example, many programs have updating functionalities capable of reporting a currently installed version of the program to an online server, and if the version is out-of-date, suggesting that the user install the new version. Such a program will often provide a link to the necessary files. Additionally, organizations often implement an installation manager to provide both software and updates. An installation manager can suggest programs and updates to install based upon programs in a repository for installation and based upon programs that are currently installed, such as non-current versions of programs.

Once an installation process has begun, many installation routines provide a "standard" installation offering a selected set of features, a "full" installation offering all possible features, and a "custom" installation allowing a user to select the features the user desires installed.

SUMMARY

Embodiments of the present invention include a method, computer program product, and computer system for suggesting a program or features of a program for installation. A computer system determines a category of users to which a user of a computer belongs. The computer system determines a relationship between the category of users and at least one program available for installation from the computer system. Based on the determined relationship, the computer system determines that at least one feature of the at least one program are of potential interest to the user of the computer. The computer system notifies the user of the at least one feature of the program of potential interest.

DETAILED DESCRIPTION

Figure 1:
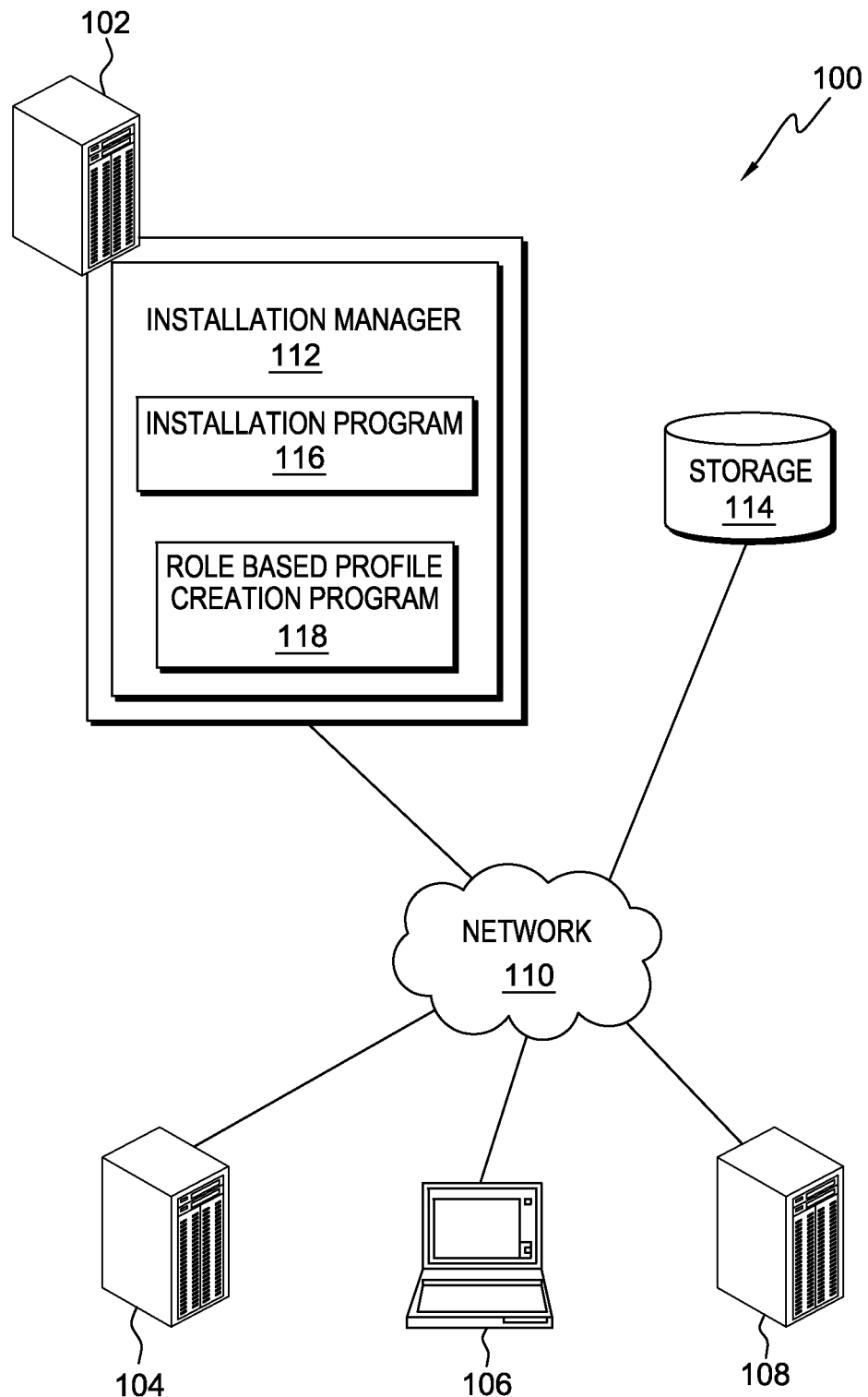
FIG. 1 is a functional block diagram illustrating a distributed data processing environment, in accordance with an embodiment of the present invention.

Embodiments of the present invention expand the suggestive capacity of installation programs, providing such a program the ability to suggest software and features for a user to consider installing based upon appropriate information regarding the user. Embodiments of the present invention may also provide the ability to categorize users and develop usage patterns of programs and features relevant to different categories. Implementation of such embodiments may take a variety forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 depicts server computer 102 and client computers 104, 106, and 108 all interconnected over network 110.

Server computer 102 may be a desktop computer, laptop computer, a specialized computer server, or any other computer system known in the art. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computing devices via a network. Exemplary components of server computer 102 are described in greater detail with regard to FIG. 4.

In various embodiments of the present invention, client computers 104, 106, and 108 can each respectively be a laptop computer, tablet computer, netbook computer, personal computer (PC), a desktop computer, a personal digital assistant (PDA), a smart phone, or any programmable electronic device capable of communicating with server computer 102 via network 110.

In general, network 110 can be any combination of connections and protocols that will support communications between server computer 102 and client computers 104, 106, and 108. Network 110 can include, for example, a local area network (LAN), a wide area network (WAN) such as the internet, a cellular network, or any combination of the preceding, and can further include wired, wireless, and/or fiber optic connections.

Installation manager 112 resides on server computer 102 and determines, suggests, and provides applications for installation by respective users of client computers 104, 106, and 108. Each of client computers 104, 106, and 108 may execute corresponding installation manager functionalities (not shown) to communicate with installation manager 112, display suggestions to a user, receive user input, and facilitate installation of selected applications. A repository of applications for installation may be kept in network storage 114, or alternatively in any storage facility accessible to installation manager 112, including local storage on server computer 102.

Installation manager 112 includes installation program 116 and role based profile creation program 118. Installation program 116 and role based profile creation program 118 may be, in one embodiment, subroutines or functions of installation manager 112. In an alternate embodiment, installation program 116 and role based profile creation program 118 may be distinct programs on server computer 102 interacting with installation manager 112. Installation program 116 suggests programs and/or features of programs for installation on a specific client computer based on the user of the client computer. More specifically, installation program 116 may make suggestions based on usage of programs and/or features by other users of a similar type or category as the user of the client computer. In one embodiment of the present invention, role based profile creation program 118 creates usage profiles for users identified as belonging to different categories. Installation program 116 may use the usage profiles to determine the programs and features the user is likely to desire or use. Exemplary implementations of installation program 116 and role based profile creation program 118 are discussed with regard to FIGS. 2 and 3, respectively.

Figure 2:
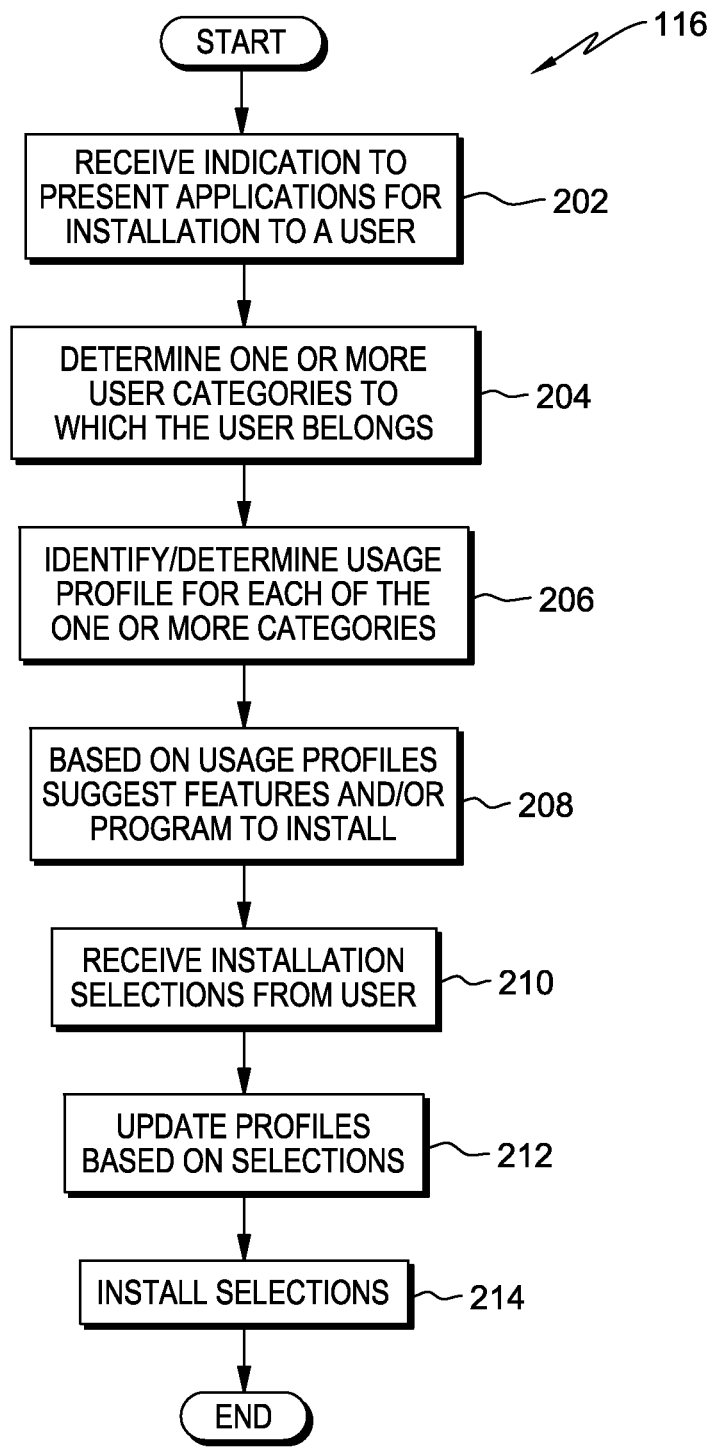
FIG. 2 is a flowchart depicting operational steps of an installation program capable of determining and suggesting programs and features of programs of potential interest to a user, in accordance with an embodiment of the present invention.

FIG. 2 is a flowchart depicting operational steps of installation program 116, in accordance with an embodiment of the present invention.

In one embodiment, installation program 116 receives an indication to present applications for installation on a client computer of a user (step 202). For example, a user of client computer 104 may request a list of available applications from installation program 116. In another embodiment, installation program 116 may periodically provide new and/or updated applications to the user. In a third embodiment, a user may request installation of a specific program, and installation program 116 may take such a request as an indication to suggest installation of various features of the requested program and/or other additional (or related) programs based upon the requested program.

Installation program 116 determines one or more categories to which the user belongs (step 204). As used herein, "category" refers to any potential grouping of users based upon any number of commonalities between the users. Exemplary categories may be based on, in a non-exclusive list: job role, a work group, a project or product development team, location of the user (geographic location, site location, building location, etc.), systems and programs currently used, colleagues and/or associations, and common installed programs and/or features. In one embodiment, such categories may be predefined in installation manager 112 and installation program 116 may analyze attributes of the user and match the user to one or more of the categories. In another embodiment, installation program 116 may query the user or prompt the user to enter relevant information, e.g., "Please enter/select your current development team." In yet another embodiment, installation program 116 may compare attributes of the user to multiple additional users, and in response to determining that a specified minimum number of people share an attribute or set of attributes, create a category.

Installation program 116 identifies or determines a usage profile for each of the one or more categories to which the user belongs (step 206). A usage profile may include statistics of programs used and/or installed by members of a category and of features used and/or installed for each of the programs. For example, a usage profile may reveal that every user (or a certain percentage of users) having a specified job role have installed or use a certain program. In another example, a usage profile may reveal that a specified percentage of users having downloaded a specific program also download another program. In yet another example, a usage profile may reveal that, of users that have a specified job role, all use a specified subset of features from a specific program. Ultimately, a usage profile may include or exclude any correlations between a category of users and programs and features used by the category of users.

In one embodiment, installation program 116 may have access to previously created categories of users and usage profiles, for example, created by role based profile creation program 118. In such an embodiment installation program 116 need only identify the profile corresponding to a determined category. In another embodiment, installation program 116 may determine a profile for the category, for example, by initiating role based profile creation program 118.

Based on the usage profile for each of the one or more determined categories, installation program 116 suggests programs and/or features of programs to install on the client computer of the user (step 208). A suggestion includes at least a notification of programs and/or features of programs that may be of potential interest to the user. In one embodiment, installation program 116 notifies the user of programs and/or features of potential interest by providing a list to the client computer of the user. Installation program 116 may also identify why each of the programs and features is selected for the user. For example: "90% of administrators use programs a and b"; "A majority of people installing program a, also install program b"; "Your colleagues installing your selected program have also installed the following features: x, y, and z"; or "Based on the use of the currently selected program by others with your job role, it is recommended you only install the following features of the program: x, y, and z." A person of ordinary skill in the art will recognize that such suggestions may take a variety of forms and presentations.

Subsequent to suggesting programs and/or features, installation program 116 receives installation selections from the user (step 210). In one embodiment, installation program 116 uses the selections to update the usage profiles for categories to which the user belongs (step 212). Installation program 116 installs, or facilitates the installation of, the selected programs and features on the client computer of the user (step 214).

Figure 3:
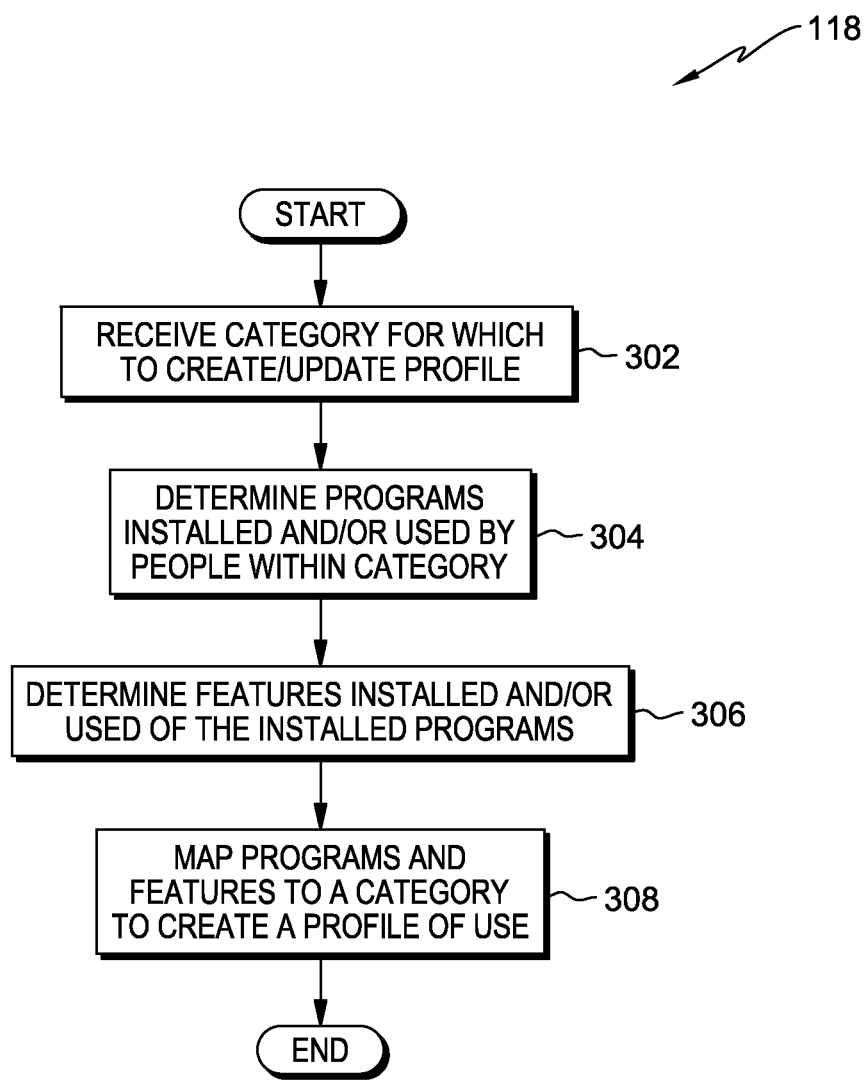
FIG. 3 depicts operational steps of a role based profile creation program for creating usage profiles for different categories of users, in accordance with an illustrative embodiment of the present invention.

FIG. 3 depicts operational steps of role based profile creation program 118 for creating usage profiles for different categories of users, in accordance with an illustrative embodiment of the present invention.

Role based profile creation program 118 receives a category for which to create or update a profile (step 302). For example, installation program 116 may send each of the determined categories of a user to role based profile creation program 118. In one embodiment of the present invention, installation manager 112 may also periodically initiate role based profile creation program 118 and send the role based profile creation program categories to be updated or created.

Role based profile creation program 118 determines programs installed and/or used by users within the category (step 304). For example, role based profile creation program 118 may query a user's system for a current list of program files, or may access log files tracking program use. In one embodiment, role based profile creation program 118 stores previous profiles for the category, for example in network storage 114, and only searches for changes occurring subsequent to the category's last profile update.

Role based profile creation program 118 may also determine features installed and/or used of programs installed by users within the category (step 306). In one embodiment, an installed program may have the functionality to respond to a query for installed and/or used features, and role based profile creation program 118 may query the installed program for this information. In another embodiment, role based profile creation program 118 may access or query system log files indicating programs and features of the programs used by users within the category. A person of ordinary skill in the art will also recognize that determining use of programs in step 304 may actually occur via the step of determining use of features of a program. For example, if role based profile creation program 118 cannot find any indication of features used by a specific program, the role based profile creation program may determine the specific program is superfluous and unnecessary on the system of the user. Persons of ordinary skill in the art may also recognize that usage profiles may already have been updated to reflect installed features (without an analysis of use) in embodiments where installation program 116 can update profiles based on user selections.

Role based profile creation program 118 maps the determined programs and features to the category to create a profile of use for the category (step 308). Different programs, such as installation program 116, may use the mapping to determine programs and features installed and used in general, and may use the mappings to determine statistics of use. In an alternate embodiment, role based profile creation program 118 may create its own statistics of use and associate the statistics with the category.

Figure 4:
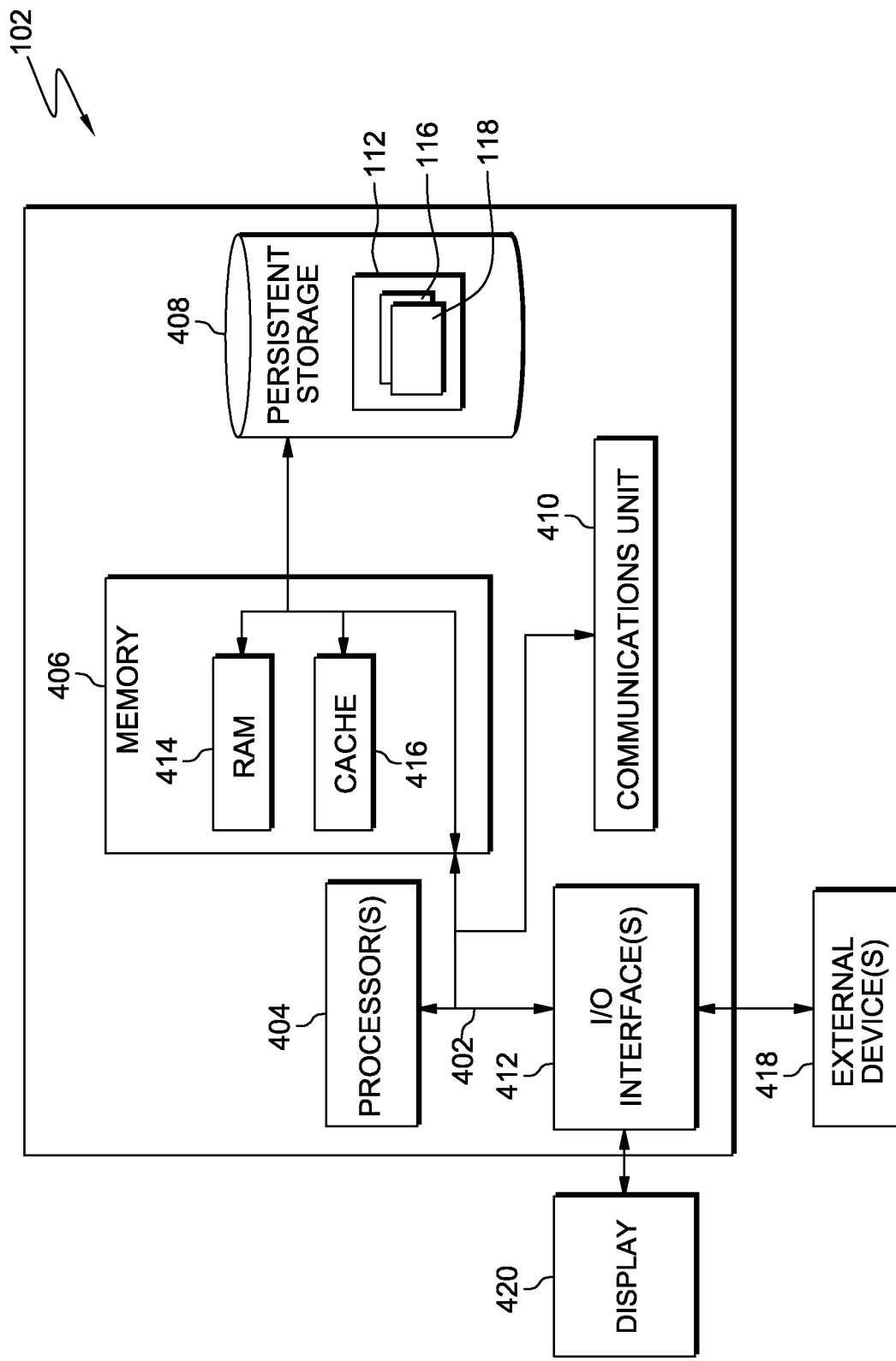
FIG. 4 depicts a block diagram of components of a computer executing the installation program and role based profile creation program, in accordance with an illustrative embodiment of the present invention.

FIG. 4 depicts a block diagram of components of server computer 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. For example, server computer 102 may comprise such components spread through multiple systems and resources and may provide systems and resources beyond what is necessary to operate embodiments of the present invention.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage medium.

Installation manager 112, installation program 116, and role based profile creation program 118 are stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as installation manager 112, installation program 116, and role based profile creation program 118, may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising the steps of:

A computer system receiving a category to which a user of a computer belongs, wherein the category is selected from the group consisting of: a job role, a work group, a group of colleagues, and a project or product development team;

The computer system determining a program installed by all members of the received category, wherein the installed program comprises a plurality of features;

The computer system determining a first set of features and a second set of features from the plurality of features of the installed program, Wherein the first set of features of the program installed by all members of the received category are recommended, by the computer system, for installation by the user of the computer, and the second set of features of the program installed by all members of the received category are not recommended by the computer system for installation by the user of the computer, based on the received category to which the user of the computer belongs;

Determining, by a computer system, a plurality of correlations between the received category to which the user of the computer belongs and the first set of features of the installed program;

Responsive to determining a plurality of correlations between the received category to which the user of the computer belongs and the first set of features of the installed program, excluding, by the computer system, a subset of correlations from the plurality of correlations, Wherein the excluded subset of correlations are associated with the determined second set of features of the program from the plurality of features;

Notifying, by the computer system, the user of the computer, of the determined first set of features of the program installed by all members of the received category;

Querying, by the computer system, a set of log files comprising programs used by all members of the received category;

Determining, by the computer system, that a set of features of a program from the set of log files are not used by all members of the received category;

Responsive to determining that the set of features of the program from the set of log files are not used by all members of the received category, determining by the computer system that the identified set of features of the program are not required on the system of the user, based on the category to which the user of the computer belongs;

Responsive to determining that the identified set of features of the program are not required on the system of the user, based on the category to which the user of the computer belongs, removing the identified set of features of the program from the set of log files comprising the programs used by all members of the received category; and Notifying, by the second computer system, a user of the second computer system, of the determined first set of features of the program installed by all members of the received category, wherein the determined first set of features of the program are updated based on the removed identified set of features of the program.

2. The method of claim 1, wherein the members of a second category of users use an identical set of features from the plurality of features of a second installed program.

3. A computer program product comprising:

One or more non-transitory computer-readable storage media and program instructions stored on the one or more non-transitory computer-readable storage media, the program instructions comprising:

Program instructions to receive a category to which a user of a computer belongs, wherein the category is selected from the group consisting of: a job role, a work group, a group of colleagues, and a project or product development team;

Program instructions to determine a program installed by all members of the received category, wherein the installed program comprises a plurality of features;

Program instructions to determine a first set of features and a second set of features from the plurality of features of the installed program, Wherein the first set of features of the program installed by all members of the received category are recommended, by the computer system, for installation by the user of the computer, and the second set of features of the program installed by all members of the received category are not recommended by the computer system for installation by the user of the computer, based on the received category to which the user of the computer belongs;

Program instructions to determine a plurality of correlations between the received category to which the user of the computer belongs and the first set of features of the installed program;

Program instructions to, responsive to determining a plurality of correlations between the received category to which the user of the computer belongs and the first set of features of the installed program, excluding, by the computer system, a subset of correlations from the plurality of correlations, Wherein the excluded subset of correlations are associated with the determined second set of features of the program from the plurality of features;

Program instructions to notify the user of the computer, of the determined first set of features of the program installed by all members of the received category;

Program instructions to query a set of log files comprising programs used by all members of the received category;

Program instructions to determine that a set of features of a program from the set of log files are not used by all members of the received category;

Program instructions to, responsive to determining that the set of features of the program from the set of log files are not used by all members of the received category, determining by the computer system that the identified set of features of the program are not required on the system of the user, based on the category to which the user of the computer belongs;

Program instructions to, responsive to determining that the identified set of features of the program are not required on the system of the user, based on the category to which the user of the computer belongs, removing the identified set of features of the program from the set of log files comprising the programs used by all members of the received category; and Program instructions to notify a user of a second computer, of the determined first set of features of the program installed by all members of the received category, wherein the determined first set of features of the program are updated based on the removed identified set of features of the program.

4. The computer program product of claim 3, wherein members of a second category of users use an identical set of features from the plurality of features of a second installed program.

5. A computer system comprising:

One or more computer processors;

One or more non-transitory computer-readable storage media;

Program Instructions stored on at least one of the one or more non-transitory computer-readable storage media for execution by at least one of the one or more computer processors, the program instructions comprising:

Program instructions to receive a category to which a user of a computer belongs, wherein the category is selected from the group consisting of: a job role, a work group, a group of colleagues, and a project or product development team;

Program instructions to determine a program installed by all members of the received category, wherein the installed program comprises a plurality of features;

Program instructions to determine a first set of features and a second set of features from the plurality of features of the installed program, Wherein the first set of features of the program installed by all members of the received category are recommended, by the computer system, for installation by the user of the computer, and the second set of features of the program installed by all members of the received category are not recommended by the computer system for installation by the user of the computer, based on the received category to which the user of the computer belongs;

Program instructions to determine a plurality of correlations between the received category to which the user of the computer belongs and the first set of features of the installed program;

Program instructions to, responsive to determining a plurality of correlations between the received category to which the user of the computer belongs and the first set of features of the installed program, excluding, by the computer system, a subset of correlations from the plurality of correlations, Wherein the excluded subset of correlations are associated with the determined second set of features of the program from the plurality of features;

Program instructions to notify the user of the computer, of the determined first set of features of the program installed by all members of the received category;

Program instructions to query a set of log files comprising programs used by all members of the received category;

Program instructions to determine that a set of features of a program from the set of log files are not used by all members of the received category;

Program instructions to, responsive to determining that the set of features of the program from the set of log files are not used by all members of the received category, determining by the computer system that the identified set of features of the program are not required on the system of the user, based on the category to which the user of the computer belongs;

Program instructions to, responsive to determining that the identified set of features of the program are not required on the system of the user, based on the category to which the user of the computer belongs, removing the identified set of features of the program from the set of log files comprising the programs used by all members of the received category; and Program instructions to notify a user of a second computer, of the determined first set of features of the program installed by all members of the received category, wherein the determined first set of features of the program are updated based on the removed identified set of features of the program.

6. The computer system of claim 5, wherein members of a second category of users use an identical set of features from the plurality of features of a second installed program.

* * * * *